UNITED STATES PATENT OFFICE.

GEORG ZUELZER, OF BERLIN-CHARLOTTENBURG, GERMANY.

NON-TOXIC SUPRARENAL PREPARATION.

1,014,198. Specification of Letters Patent. Patented Jan. 9, 1912.

No Drawing. Application filed July 7, 1910. Serial No. 570,736.

*To all whom it may concern:*

Be it known that I, GEORG ZUELZER, doctor of medicine, citizen of the German Empire, residing at Berlin-Charlottenburg, Kingdom of Prussia, German Empire, have invented a new and useful Improvement in Non-Toxic Suprarenal Preparations, of which the following is a specification.

It has been found that suprarenal preparations influence both the pressure of the blood and the metabolism of sugar and that these actions are related so that if it were possible to lessen or increase one action the other would be correspondingly modified. According to this invention I add to such suprarenal preparations extracts or juices obtained by compressing a suitable abdominal organ, as for instance the pancreas, the spleen, or liver. The juice of pancreas gives the best results. Such addition paralyses the mobilization of sugar due to the said preparations and simultaneously lessens their typical action of increasing the pressure of the blood while the addition produces a peculiar unknown action on the heart which corresponds to that of digitalis. The heart will now beat slowly and powerfully while without such addition the heart beat would be considerably accelerated and the pulse diminished. The addition of such bodies to suprarenal preparations thus renders them to a certain degree non-toxic in so far as the injurious or quasi toxic action of suprarenal preparations, consisting in suddenly raising the blood pressure, and in the mobilization of sugar, is greatly diminished or entirely removed. This action seems to be due to a chemical alteration of the suprarenal preparations as appears from the fact that the addition of ammonium sulfate to such preparations or to pancreas or other extract which is free from albuminous matter produces no precipitate, while after the addition of such extract to such suprarenal preparations a precipitate is formed by the addition of ammonium sulfate. For example there is added to a solution of 0.8 milligrams of a suprarenal preparation (whose injection into a rabbit produces the above mentioned unfavorable action upon the heart as well as an enormous rise in the pressure of the blood and a large precipitation of sugar in the urine) 2 cubic centimeters of a juice obtained by compression of the pancreas (or another suitable organ such as the spleen or liver) and allow this substance to react for at least one hour. If the suprarenal preparation so treated be again injected no precipitation of sugar then takes place or a large rise of the pressure of the blood and the heart reacts in the favorable manner above mentioned.

I claim as my invention—

1. The herein described suprarenal preparation which contains the blood-pressure-raising and sugar-mobilizing suprarenal substance and the extract from a suitable abdominal organ, such preparation, if injected, operating with a modified mobilization of sugar and diminished raising of the blood pressure, substantially as set forth.

2. The herein described suprarenal preparation which contains the blood-pressure-raising and sugar-mobilizing suprarenal substance and pancreas extract, substantially as set forth.

3. The herein described process of manufacturing suprarenal preparations which consists in mixing the blood-pressure-raising and sugar-mobilizing suprarenal substance with the extract from a suitable abdominal organ which neutralizes the blood-pressure-raising and sugar-mobilizing effect of the suprarenal substance, substantially as set forth.

4. The herein described process of manufacturing suprarenal preparations which consists in mixing the blood-pressure-raising and sugar-mobilizing suprarenal substance with pancreas extract, substantially as set forth.

In testimony whereof I hereunto set my signature in the presence of two subscribing witnesses.

GEORG ZUELZER.

Witnesses:
HENRY HASPER,
WOLDEMAR HAUPT.